(12) United States Patent
Jones et al.

(10) Patent No.: US 11,798,327 B2
(45) Date of Patent: Oct. 24, 2023

(54) UNIVERSAL SMART INTERFACE FOR ELECTRONIC LOCKS

(71) Applicant: Latch, Inc., New York, NY (US)

(72) Inventors: Michael Brian Jones, New York, NY (US); Luke Andrew Schoenfelder, New York, NY (US); Sarah Margaret Plis, New York, NY (US); John Thomas Jacobsen, New York, NY (US); Euan Scott Foster Abraham, San Francisco, CA (US); Sage Wright, Brooklyn, NY (US); Tracy Van Dyk, New York, NY (US); Tim Stonelake, New York, NY (US); Anna Petruczynik, Hoboken, NJ (US)

(73) Assignee: Latch Systems, Inc., New York, NY (US)

( * ) Notice: Subject to any disclaimer, the term of this patent is extended or adjusted under 35 U.S.C. 154(b) by 271 days.

(21) Appl. No.: 17/145,952

(22) Filed: Jan. 11, 2021

(65) Prior Publication Data
US 2021/0225100 A1 Jul. 22, 2021

Related U.S. Application Data

(60) Provisional application No. 62/962,365, filed on Jan. 17, 2020.

(51) Int. Cl.
*G07C 9/00* (2020.01)
*H04W 4/80* (2018.01)

(52) U.S. Cl.
CPC .......... *G07C 9/00309* (2013.01); *H04W 4/80* (2018.02); *G07C 2009/00412* (2013.01); *G07C 2009/00603* (2013.01); *G07C 2209/62* (2013.01)

(58) Field of Classification Search
CPC ...... G07C 9/00309; G07C 2009/00412; G07C 2009/00603; G07C 2209/62
See application file for complete search history.

(56) References Cited

U.S. PATENT DOCUMENTS

| 2016/0225212 A1* | 8/2016 | Chou | G07C 9/00174 |
| 2017/0011573 A1* | 1/2017 | Belhadia | G07C 9/00563 |

(Continued)

FOREIGN PATENT DOCUMENTS

WO 2018005458 A1 1/2018

OTHER PUBLICATIONS

European Search Report and Written Opinion for the European Patent Application No. EP21176293, dated Nov. 24, 2021, 14 pages.

*Primary Examiner* — Nabil H Syed
(74) *Attorney, Agent, or Firm* — KDW Firm PLLC

(57) ABSTRACT

A smart module configured to control electronic locking devices may include a plurality of wireless interfaces configured to operate in accordance with at least one of a plurality of wireless protocols. The smart module may include a communications interface having a plurality of pins to couple to an electronic locking device. The smart module may include a memory coupled with the plurality of wireless interfaces, processing circuitry, the communications interface, and a touch display. The memory may include instructions, that when executed by the processing circuitry, cause the processing circuitry to receive, via the touch display, a request to cause an action on the electronic locking device, and transmit a command to the electronic locking device via the communications interface to cause the action on the electronic locking device.

20 Claims, 10 Drawing Sheets

(56) References Cited

U.S. PATENT DOCUMENTS

| | | |
|---|---|---|
| 2017/0124792 A1 | 5/2017 | Schoenfelder et al. |
| 2018/0005470 A1* | 1/2018 | Stephens ............ G07C 9/00309 |
| 2018/0108196 A1 | 4/2018 | Abner |
| 2020/0043271 A1* | 2/2020 | Anderson ........... G07C 9/00571 |
| 2020/0263448 A1* | 8/2020 | Kincaid .................. E05B 15/02 |
| 2020/0327758 A1 | 10/2020 | Ma et al. |
| 2021/0065489 A1* | 3/2021 | Hass ........................ G07C 9/22 |

* cited by examiner

__(1)__

UNIVERSAL SMART INTERFACE FOR ELECTRONIC LOCKS

CROSS-REFERENCE TO RELATED APPLICATIONS

This application claims priority to U.S. Provisional Application No. 62/962,365, filed on Jan. 17, 2020, which is incorporated herein by reference in its entirety.

BACKGROUND

Conventional locking devices, such as a deadbolt lock, must be manually controlled. Often, users replace these locking devices with more modern electronic devices. However, to enable "smart functionality" on these electronic devices, a given manufacturer must entirely design these systems, including circuit boards, firmware, communications interfaces, and the like. Furthermore, in settings where multiple different types of electronic locking devices are implemented, these devices must be replaced with similar types of electronic locking devices. Stated differently, one type of electronic locking device cannot replace all different types of electronic locking devices in these settings without significant modification to, or replacement of, the door and frame.

BRIEF SUMMARY

In one aspect, a smart module configured to control electronic locking devices, includes a plurality of wireless interfaces, where each of the plurality of wireless interfaces are configured to operate in accordance with at least one of a plurality of wireless protocols. The smart module also includes a communications interface that includes a plurality of pins to couple to switches, motors, and/or power sources of an electronically controlled locking device. The smart module also includes a touch display. The smart module also includes processing circuitry coupled with the plurality of wireless interfaces, the touch display, and the communications interface. The smart module also includes a memory coupled with the plurality of wireless interfaces, the processing circuitry, the communications interface, and the touch display, the memory includes instructions, that when executed by the processing circuitry, cause the processing circuitry to receive, via the touch display or one of the plurality of wireless interfaces, a request to cause an action on the electronic locking device, and transmit a command to the electronic locking device via the communications interface to cause the action on the electronic locking device.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1B:
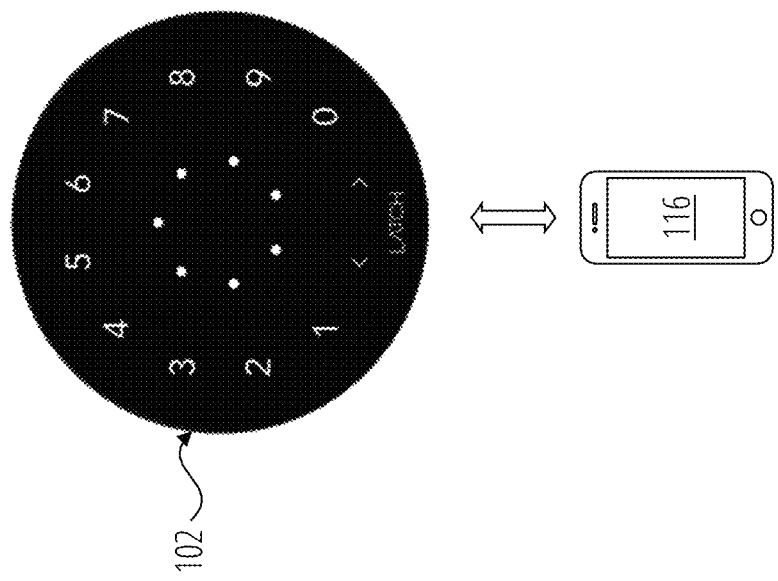
FIG. 1B illustrates an aspect of the subject matter in accordance with one embodiment.

Embodiments disclosed herein provide for a smart module that controls electronic locking devices of any type. In some embodiments, the smart module is a self-contained, plug and play electronics module with a user interface to enable a user experience for third-party locking integrations or other electronic access devices (e.g., card readers, electrical panels, switches). The smart module can interface with a third-party locking mechanism and can provide "smart lock" or "access control" features described throughout the present disclosure. In this way, a third-party lock manufacturer can provide smart lock features without having to design a separate electronics module with a user interface, unlocking and credentialing support, applications (e.g., smartphone application, etc.), enterprise device management, backend services, etc.

The disclosed smart module can drive a motor or disengage a magnetic lock to unlock via a pin code entry and/or via a computing device, and/or via a near-field communication (NFC) credential. For example, the smart module may control the electronic locking device based on commands received via mobile application utilizing on-device wireless communication, an NFC card, and/or a pin code provided via a mobile application, SMS message, or other means of electronic delivery. In some embodiments, the smart module can enable an Internet triggered IP-unlock. While the smart module is designed to function as a stand-alone device without the need for external microcontrollers or other active electronics, in some embodiments, the smart module can also have the ability to communicate with partner electronics through configurable inputs/outputs and/or a communication bus.

The smart module can include a capacitive touch lens with NFC proximity sensing capabilities, H-Bridge motor control, a capacitive touchpad, a Bluetooth Low Energy radio, secure authentication, an light emitting diode (LED) display, digital inputs (that can sense microswitches signaling door open/close state, manual operation, bolt position, etc.), and power conversion circuitry. The smart module may be fully sealed, waterproof, scratch proof, and tamper resistant.

Reference is now made to the drawings, wherein like reference numerals are used to refer to like elements throughout. In the following description, for purposes of explanation, numerous specific details are set forth in order to provide a thorough understanding thereof. However, the novel embodiments can be practiced without these specific details. In other instances, well known structures and devices are shown in block diagram form in order to facilitate a description thereof. The intention is to cover all modifications, equivalents, and alternatives consistent with the claimed subject matter.

In the Figures and the accompanying description, the designations "a" and "b" and "c" (and similar designators) are intended to be variables representing any positive integer. Thus, for example, if an implementation sets a value for a=5, then a complete set of components 122 illustrated as components 122-1 through 122-a may include components 122-1, 122-2, 122-3, 122-4, and 122-5. The embodiments are not limited in this context.

Figure 1A:
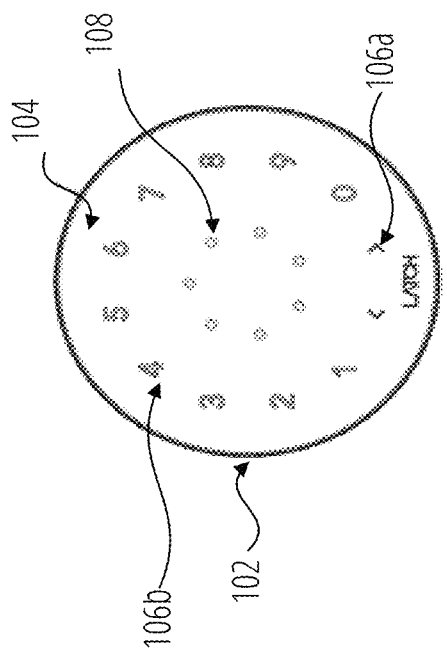
FIG. 1A illustrates an aspect of the subject matter in accordance with one embodiment.

FIG. 1A illustrates an example smart module 102 (also referred to as a "smart lens"), according to one embodiment. It should be noted that the particular coloring/shading/design of the smart module 102 in FIG. 1A is for illustration purposes only, as the smart module 102 may have any coloring/shading/design, such as that of the smart module 102 depicted in FIG. 1B. The smart module 102 may generally be waterproof and corrosion proof, e.g., IP65 (or greater) compliant. The smart module 102 may further have protection against ultraviolet light, be resistant to saltwater, and be scratch resistant. Advantageously, the smart module 102 is tamper resistant, and may meet relevant standards, e.g., UL, ANSI/BHMA, FCC, etc.

As shown, the smart module 102 includes a touch display 104, also referred to as a touch-sensitive display. The touch display 104 is generally configured to provide a touch-sensitive user interface that may include a plurality of user interface elements 106a-n (where n is any positive integer greater than 1), such as the interface element 106a and interface element 106b. The interface element 106a is configured to "enter" input, e.g., submit a PIN code or other input, such as a command to be implemented on an electronic locking device. The interface element 106b corresponds to one of a plurality of digits displayed on the touch display 104. More generally, the interface elements 106a-n may include the digits 0-9, a back (or delete) interface element (e.g., to delete previous input), and the enter interface element (e.g., to enter and/or submit input and/or commands). In some embodiments, the user may use the interface elements 106a-n to enter a personal identification number (PIN), such as 7-digit pin code (e.g., 1234567). The PIN may be for a registered user, e.g., a homeowner/tenant. In some embodiments, the PIN may be a guest PIN created for service professionals, delivery services, etc. The smart module 102 may generally compare an inputted PIN to an access control list stored on the device, and if the comparison results in a match of one or more entries on the access control list, the smart module 102, may be unlocked and the code used referenced for metadata related to the event for logging purposes (e.g., traceability for that code). Once unlocked, the user may use the touch display 104 to input a variety of different commands, such as to lock an electronic locking device (not pictured), unlock the electronic locking device, etc. The electronic locking device may be any type of electronic locking device, such as a deadbolt lock, mortise lock, thumb turn lock, electromagnetic locking device, and the like.

The touch display 104 also includes a plurality of status indicators 108, which may illuminate to reflect that the smart module 102 is performing some operation, such as receiving input, processing input, transmitting commands to an electronic locking device coupled to the smart module 102, updating firmware of the smart module 102, etc. The status indicators 108 can be used in combination with the interface elements 106 to distinguish between a PIN code unlock and an NFC unlock to give a context-specific UI. For example, one or more status indicators 108 may illuminate according to a first predetermined pattern for a successful PIN code unlock, while one or more status indicators 108 may illuminate according to a second predetermined for an unsuccessful PIN code unlock, and so forth. As another example all of the status indicators of 106, 108, or some combination may play an animation to signal specific actions the smart module 102 is performing.

As shown in FIG. 1B, the smart module 102 may communicate with a mobile device 116. The mobile device 116 is representative of any type of mobile computing device, such as a smartphone, tablet computer, smart watch, wearable device, laptop, and the like. Generally, when a mobile device 116 comes within a predefined range of the smart module 102, the mobile device 116 may wirelessly transmit an access credential to the smart module 102. The wireless transmission may be in accordance with a plurality of wireless protocols, such as a near-field communication (NFC) protocol, 802.11 protocol, Bluetooth protocol, Bluetooth low energy (BLE) protocol, radio frequency identification (RFID), and the like. Generally, the mobile device 116 may store an access credential, e.g., as a file, and transmit the access credential to the smart module 102. In some embodiments, the smart module 102 may process the access credential to unlock the touch display 104 and generally allow the smart module 102 to receive commands or other input. In some embodiments, the smart module 102 may leverage capacitive proximity sensing to unlock via a smartcard or a keycard. In some embodiments, the proximity sensing may include detecting a person within a predefined distance of the smart module 102. In other embodiments, the proximity sensing includes NFC-based proximity sensing, e.g., detecting a Bluetooth and/or NFC-enabled device within a predefined distance of the smart module 102.

Figure 1D:
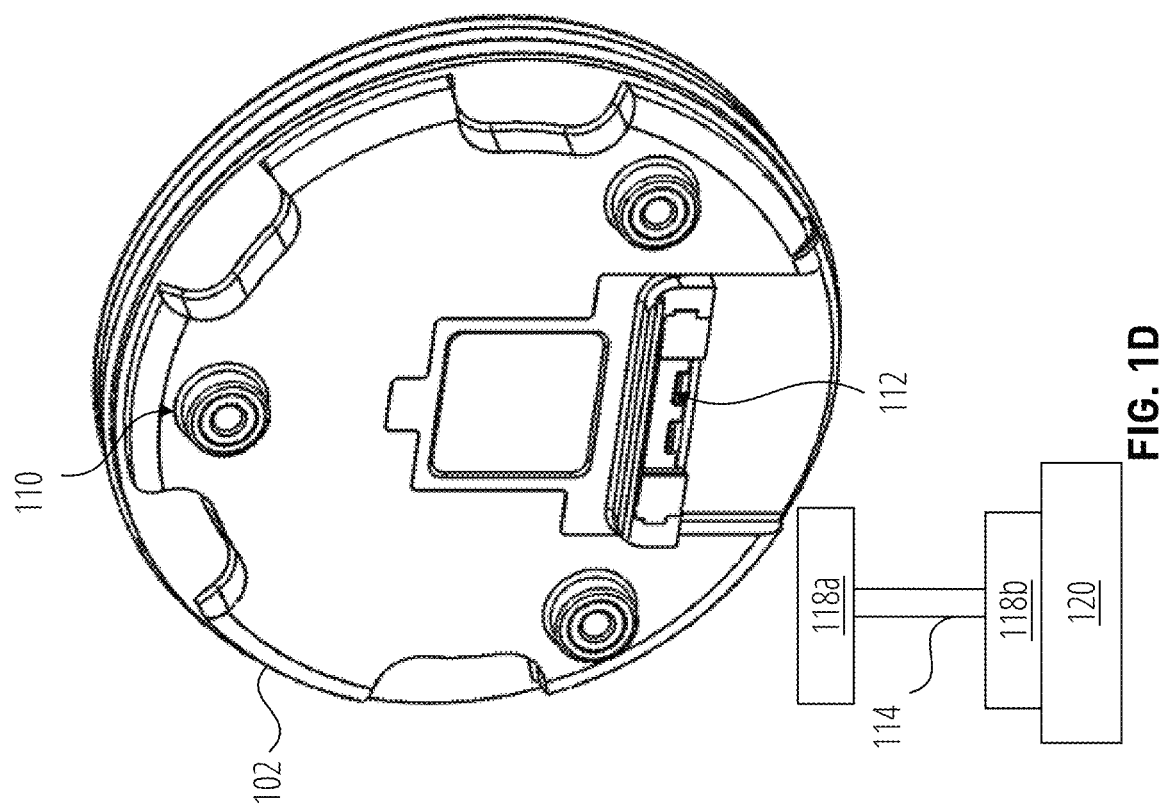
FIG. 1D illustrates an aspect of the subject matter in accordance with one embodiment.
Figure 1C:
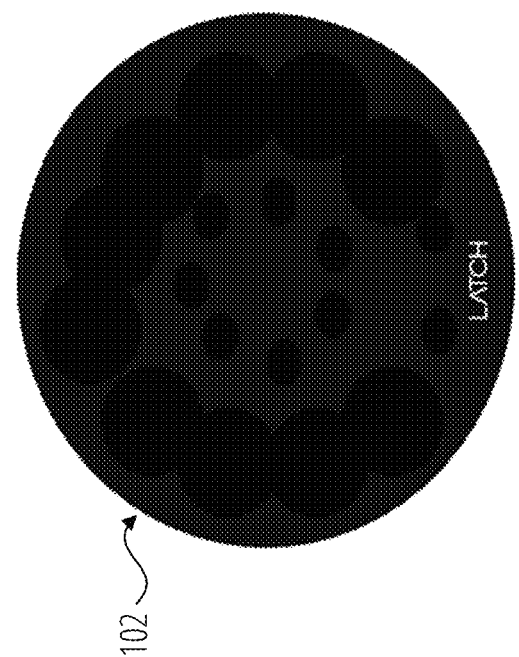
FIG. 1C illustrates an aspect of the subject matter in accordance with one embodiment.

When the smart module 102 is dormant, or otherwise not receiving user input, the touch display 104 and associated LEDs may be turned off (or otherwise dimmed) to conserve energy, as depicted in FIG. 1C. However, when touched, the smart module 102 may light up. Similarly, the smart module 102 may light up when sensing a BLE device, an NFC device, a smart card, etc. in a context specific way (e.g. the interface elements 106 may flash in a predetermined pattern if the credential presented is not valid).

FIG. 1D is a rear-view of the smart module 102. As shown in FIG. 1D, the smart module 102 further includes one or more mounting elements 110 and a connector 112. The mounts 110 may be any suitable element to secure the smart module 102 to an electronic locking device, such as the electronic locking device 120. The connector 112 (also referred to as a communications interface) may include a plurality of pins for communicating with an electronic locking device 120. The connector 112 may be IP65 compliant, e.g., water resistant and/or corrosion resistant. The plurality of pins of the connector 112 may be configured based on a type of the electronic locking device 120 to which the smart module 102 is connected. The electronic locking device 120 may be any type of locking device which has been adapted with electronic mechanisms for control. Examples of such locking devices include, but are not limited to, deadbolt locks, mortise locks, electromagnetic locking devices, and the like. Additional examples of such locking devices include electrified locking devices, which are permanently powered, and the power is the method of control (e.g., powering the electrified lock to lock the device, or removing power to unlock the device). Therefore, the use of an electronic locking device as a reference example should not be considered limiting of the disclosure, as the disclosure is equally applicable to electrified locking devices.

The smart module 102 may be connected to the electronic locking device 120 via a cable 114, which includes a connector 118a, and a connector 118b. Generally, one end of the cable 114 may be connected to the connector 112 of the smart module 102 via one of the connectors 118a-b, and the other end of the cable 114 may be connected to the electronic locking device 120 via the other one of the connectors 118a-b. In some embodiments, two or more cables 114 may be used to couple the smart module 102 and the electronic locking device 120. In some embodiments, one cable 114 with multiple separate junctions and terminations may be used to couple the smart module 102 and the electronic locking device 120. For example, one cable 114 can be provided for front connection, and another cable 114 for rear connection. In some embodiments, the one or more cables 114 can include at least one ground, power, communication, switching output, and/or input connections, such as pinouts. The connector 112 can be made to be weather sealed and pluggable, so that a wide variety of cable terminations can be supported with one module design.

Generally, when an operation is performed on the smart module 102 and/or an electronic locking device 120 via the smart module 102, one or more records may be stored in an access log in the memory 236. The access logs are stored in the memory 236 of the smart module 102 and can be transferred to devices such as the mobile device 116 via BLE. The records may include a timestamp, operation type, requesting entity, and the like. The access logs may or may not be packaged with device debugging data monitoring system health (e.g., motor current required). Records of access time and user can be surfaced in an app on the mobile device 116 depending on the user's permission levels. Generally, users can see their logs and guest logs on their device 116. Property managers can see logs of all users on common area devices, etc. In some embodiments, the mobile device 116 may transmit the logs to a cloud-based server for storage.

Figure 2:
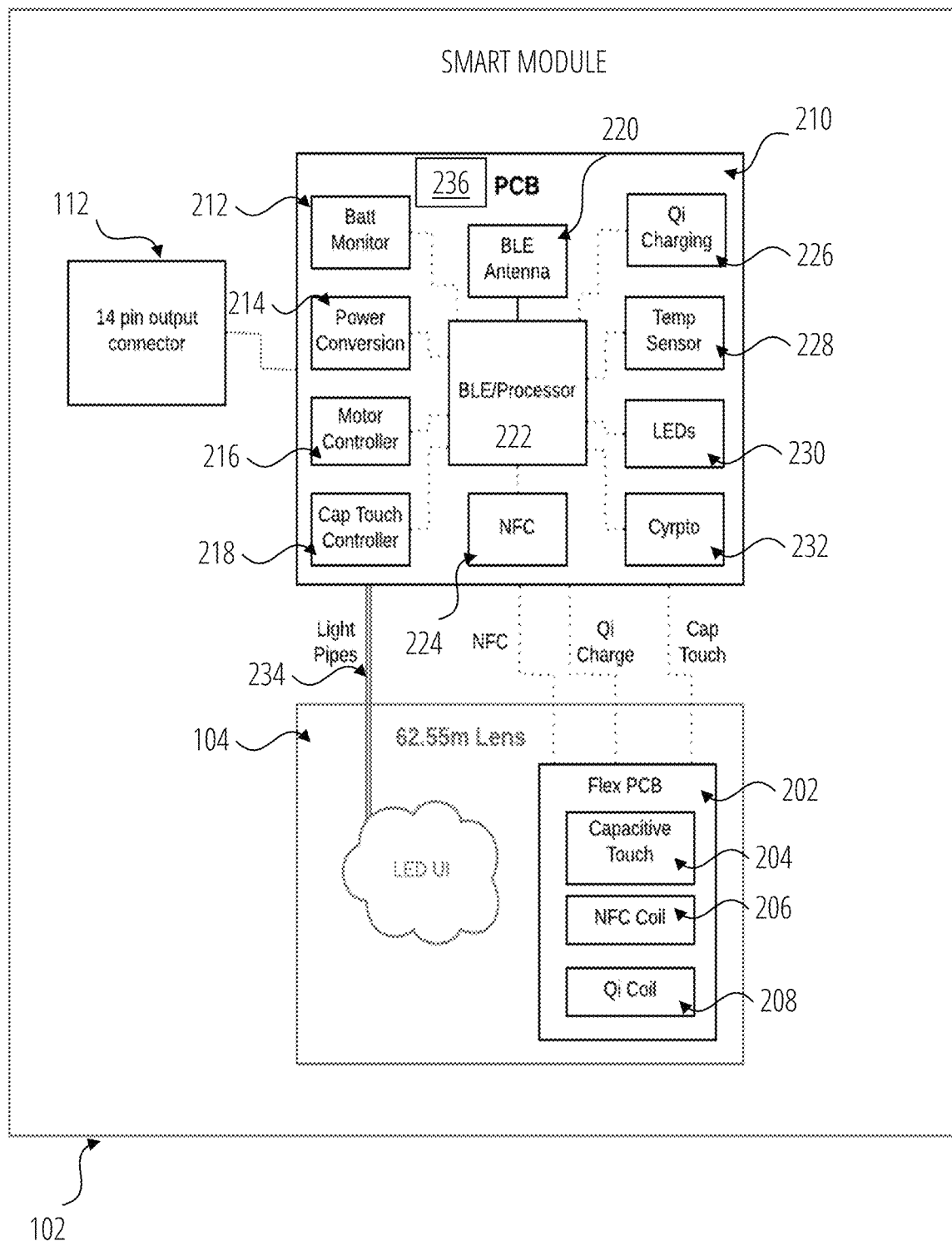
FIG. 2 illustrates an aspect of the subject matter in accordance with one embodiment.

FIG. 2 illustrates a more detailed view of the smart module 102, according to various embodiments. As shown, the smart module 102 includes the touch display 104, the connector 112, a printed circuit board (PCB) 202, a capacitive touch component 204, an NFC coil 206, a Qi® wireless charging coil 208, a PCB 210, a battery monitor 212, a power conversion module 214, a motor controller 216, a capacitive touch controller 218, a BLE antenna 220, a processor 222, an NFC component 224, a Qi charger 226, a temperature sensor 228, an LEDs 230, a cryptographic module 232, one or more light pipes 234, and a memory 236. The components of the smart module 102 may generally include sealed and covered electronics for tamper-proofing and waterproofing.

The capacitive touch component 204 may enable touch input to be received via the touch display 104. In one embodiment, the capacitive touch component 204 may be affixed to the rear of the touch display 104 to enable touch input to be received via the touch display 104. The NFC coil 206 is an NFC transceiver configured to communicate with other NFC-enabled devices, such as the mobile device 116. In some embodiments, the NFC coil 206 and the Qi coil 208 are integrated into a single coil. The Qi coil 208 is a transceiver configured to receive wireless power and/or transmit wireless power. For example, a Qi charger (e.g., a component of the mobile device 116) may provide power to the smart module 102 via the Qi coil 208, e.g., when one or more batteries (not pictured) of the smart module 102 do not have sufficient power. In another embodiment, the Qi coil 208 is the primary and sole source of power for the smart module 102. Conversely, the smart module 102 may provide power to a mobile device 116 to provide the power required to transmit a credential from the mobile device 116 to the smart module 102, e.g., when the mobile device 116 does not have sufficient power. Although Qi is used as a reference example of one or more wireless charging components, the smart module 102 may include any type of inductive charging components for wireless power transfer.

The battery monitor 212 is generally configured to monitor the charge level of one or more batteries that may power the smart module 102. Doing so may allow the charge level to be transmitted to the mobile device 116 such that a user can monitor the battery level. Similarly, the smart module 102 may generate and transmit a notification to the mobile device 116 when the battery monitor 212 determines that the battery level is below a predetermined threshold. In some embodiments, the smart module 102 may shut down or otherwise enter a lower-power state when the battery level is below the threshold. However, in some embodiments, the smart module 102 may be powered by a wired power source. In such embodiments, the batteries may be omitted and/or included as backup power in case the wired power source is unavailable.

The power conversion module 214 is generally configured to convert power provided to the smart module 102. For example, the power conversion module 214 may convert from a range of battery or DC voltages to power used by the smart module 102. The motor controller 216 is generally configured to drive a motor that can lock or unlock an electronic locking device 120 coupled to the smart module 102. Similarly, the motor controller 216 generally enables the locking and/or unlocking of the electronic locking device 120 coupled to the smart module 102. Doing so may transform the electronic locking device 120 into a "smart" locking device. In one embodiment, the motor is a component of the smart module 102. In other embodiments, the motor is a component of the electronic locking device 120.

The capacitive touch controller 218 is generally configured to process touch input received via the capacitive touch component 204. The BLE antenna 220 is a Bluetooth low energy (BLE) transceiver to communicate with other Bluetooth low energy (BLE) devices, such as the mobile device 116. In some embodiments, a radio frequency (RF) front end can be implemented in the smart module 102 to extend the power of the BLE antenna 220. In some embodiments, the BLE antenna 220 operates in peripheral mode, and has the ability to connect to multiple devices for connections to a Wi-Fi bridge or other compatible device, such as a plurality of mobile devices 116. The BLE antenna 220 may advertise at variable (e.g., 100 ms, 400 ms, etc.) intervals with a 30 ft range. The advertising frequency ensures a fast time to unlock or lock the electronic locking device 120. By connecting to a Wi-Fi bridge and/or a mobile device 116, the smart module 102 may be controlled remotely, e.g., via the Internet or a cloud service. For example, using an application on the mobile device 116, an authenticated user may transmit a remote command to the smart module 102 via the Internet. The smart module 102 may then cause the remote command to be performed by the electronic locking device 120. In some embodiments, client-side SSL termination for Wi-Fi and/or Ethernet integration in the smart module 102 is provided. In some embodiments, a full set of application programming interfaces (APIs) for communication can be exposed by the smart module 102 for Wi-Fi, Ethernet, or other IP protocol supported integrations. A full API can also be provided for cloud-based communication (e.g., for unlocking, credentialing).

The processor 222 is a processor circuit and may be any type of processor circuit, FPGA, ASIC, or the like. The processor 222 may have a fully secure boot mechanism with a root of trust to ensure the smart module 102 boots securely. After being reset, the firmware can only boot when verified as trusted, e.g., based on hash validation of the firmware. A bootloader of the smart module 102 may be stored in an immutable flash memory, which may be included in the memory 236. To enhance security, the smart module 102 may not provide Joint Test Action Group (JTAG) access, e.g., disable JTAG reads, JTAG writes, and/or JTAG fuse. The memory 236 is any type of storage medium or device, and is representative of one or more memory storage devices. The NFC component 224 is generally configured to process data to be transmitted and/or received via the NFC coil 206. As stated, the Qi charger 226 may provide power to the smart module 102, where the power may be wirelessly received via the Qi coil 208. Similarly, the Qi charger 226 and/or Qi coil 208 may transmit (or provide) power to other devices, such as a mobile device 116.

The temperature sensor 228 may generally monitor a temperature of the smart module 102. If the temperature is outside a range of acceptable temperature values (e.g., −35 degrees Celsius to 70 degrees Celsius), the smart module 102 may be put to sleep, shut down, or otherwise modified to bring the temperature within the acceptable range of temperatures, or modify the behavior of the smart module 102 to accommodate environmental impacts to performance. The LEDs 230 are representative of any number and type of light emitting diodes. Generally, the LEDs 230 are configured to illuminate the touch display 104 and display information to the user.

The cryptographic module 232 may be a secure processing and storage element that stores and processes encryption keys, access credentials, and/or other sensitive data. For example, the processor 222 may receive an access credential from the mobile device 116 via Bluetooth and/or NFC. The processor 222 may then provide the access credential to the cryptographic module 232, which may process (e.g., attempt to decrypt) the access credential and return a result (e.g., a decryption result, successful decryption, unsuccessful decryption, successful authentication, and/or unsuccessful authentication). In one example, the cryptographic module 232 may decrypt the access credential and compare the decrypted access credential to one or more valid access credentials stored in the cryptographic module 232. In other embodiments, the access credential is unencrypted, and the cryptographic module 232 may compare the access credential to one or more access credentials in an access control list securely stored in the cryptographic module 232. In other embodiments, the comparison is performed by the processor 222, e.g., subsequent to decryption by the cryptographic module 232. The cryptographic module 232 may generally include hardware acceleration for a processor portion of the cryptographic module 232 (e.g., a cryptographic processor and/or accelerator). Similarly, the cryptographic module 232 may perform encryption and/or decryption operations using the encryption keys of the smart module 102. In some embodiments, the smart module 102 is uniquely identifiable by the encryption keys stored in the cryptographic module 232. In other embodiments, the smart module 102 is uniquely identifiable based on a unique identifier (e.g., a serial number) assigned to the smart module 102 and stored in the memory 236. The keys stored by the cryptographic module 232 may further include other types of keys, such as tokens, alphanumeric strings, etc.

In some embodiments, the smart module 102 may leverage cloud-based credential validation. For example, if a user enters a PIN code via the touch display 104, the smart module 102 may transmit the entered PIN code to a cloud server that performs the comparison of the PIN code to one or more stored PINs for the smart module 102 in cloud-based storage. If the comparison results in a match, the cloud server may transmit an indication of validation of the PIN to the smart module 102. In some embodiments, the cloud server may further transmit a command to the smart module 102 (e.g., an unlock command, lock command, etc.) to be implemented on the electronic locking device 120 by the smart module 102 based on the validation of the PIN. Otherwise, the cloud server may transmit an indication of failed validation of the PIN to the smart module 102. Similarly, the cloud server may include the cryptographic module 232 and/or the functionality of the cryptographic module 232 described herein. For example, the cloud server may attempt to decrypt encrypted access credentials received from the smart module 102 and return a result to the smart module 102 (e.g., successful decryption, unsuccessful decryption, successful authentication, and/or unsuccessful authentication). In such embodiments, the cloud server may include the encryption keys for each smart module 102 to perform the cryptographic operations. If the decryption is successful, the cloud server may further transmit a command to the smart module 102 (e.g., an unlock command, lock command, etc.) to be implemented on the electronic locking device 120 based on the successful decryption. In some embodiments, a mobile device 116, base station, or other device with an Internet connection may facilitate communication between the smart module 102 and the cloud server.

In some embodiments, the firmware may provide different access permissions, or privileges, based on the requesting device and/or user account. For example, a key associated with a manufacturer of the smart module 102 may have full access privileges to all components and/or data of the smart module 102. Similarly, a key associated with a purchaser of the smart module 102 may have a more limited set of privileges relative to the manufacturer privileges. Further still, a key assigned to a 3rd party user, such as a maintenance person, may have a more limited set of privileges relative to the purchaser and/or the manufacturer.

The one or more light pipes 234 provide a channel from the LEDs 230 to the touch display 104. In some embodiments, the touch display 104 and/or the PCB 202 may be a predefined distance from the PCBs 210. Doing so may act as a light guide, e.g., via the light pipes 234, and also acts as a spacer between the PCB 202 and PCB 210. Advantageously, the spacing also allows the PCB 202 to be mounted to the touch display 104.

In some embodiments, full integration with mobile applications executing on mobile devices 116 for end users, building managers, and backend software with subscription service is provided via the smart module 102. In some embodiments, the smart module 102 does not need to be connected to the Internet to allow unlocking. For example, the smart module 102 can connect to a user's mobile device 116 via Bluetooth and use an Internet connection of the mobile device 116 (e.g., cellular and/or Wi-Fi) to authenticate an unlock attempt or update its access credentials. In some embodiments, the configurable parameters of the firmware can be adjusted in an app executing on the mobile device 116 (e.g. turning a buzzer feature on or off can be done in factory firmware, selected in the application on the mobile device 116, or both).

In some embodiments, certain parameters of the smart module 102 are not configurable, such as reset behavior, jamming behavior, etc. Similarly, other parameters of the smart module 102 may be configurable, e.g., via a mobile device 116 application, the touch display 104, etc. Doing so isolates mechanism-specific code paths, reduces complexity in validation stages, and provides the ability to deliver a single firmware for the smart module 102 that supports a wide range of electronic locking devices 120.

In some embodiments, the smart module 102 can be configured for a third-party applications. A step by step guide for factory configuration of the smart module 102 for the specific application can be provided to third parties to configure the smart module 102 with a particular electronic locking device 120. This can include any settings to program the smart module 102 to operate as needed for a third-party application, including enabling or disabling interfaces, motor settings, setting the mode and polarity for sensors and switches, and power configurations.

Figure 3:
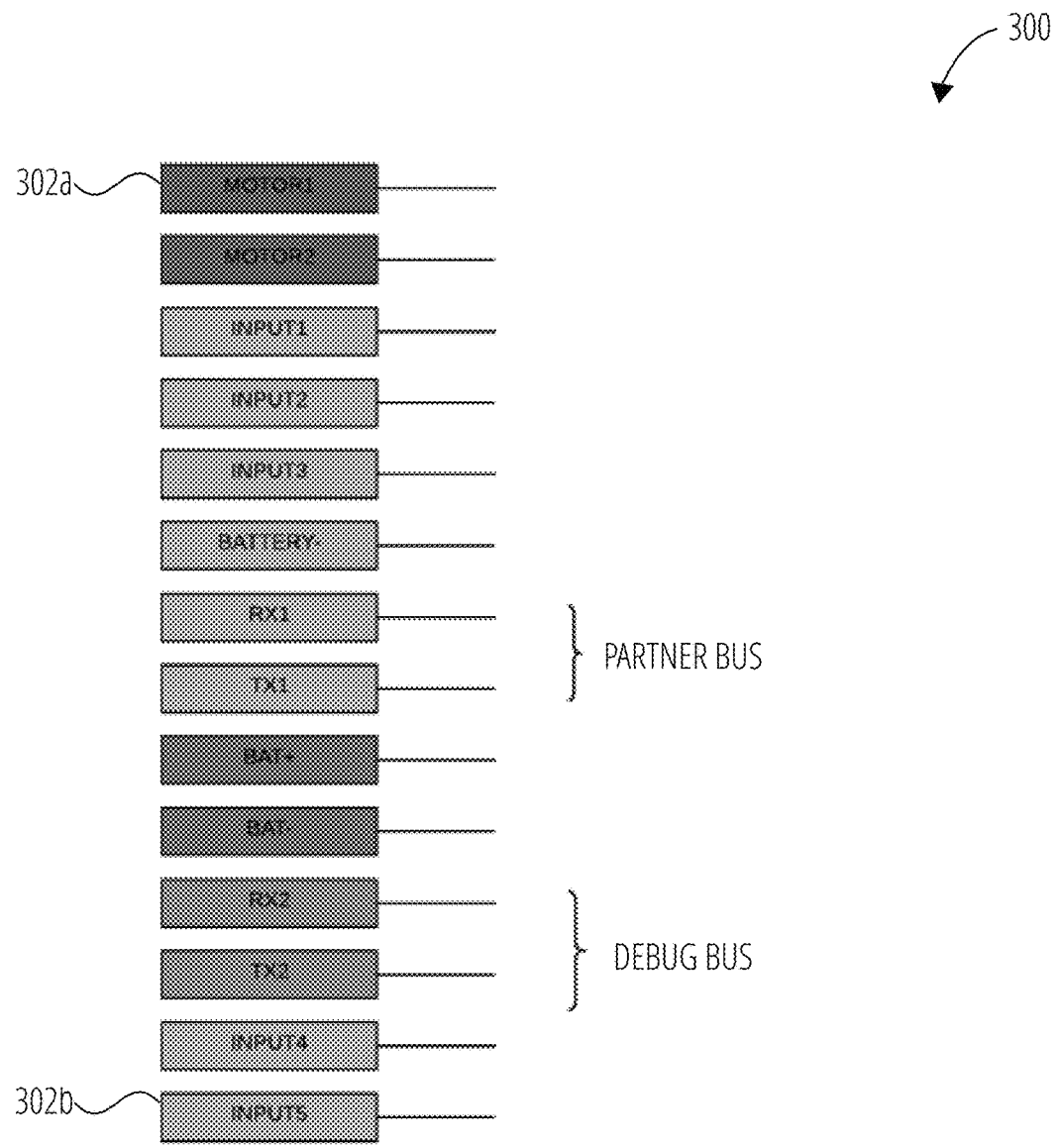
FIG. 3 illustrates an aspect of the subject matter in accordance with one embodiment.

FIG. 3 is a schematic 300 illustrating an example configuration of a plurality of pins 302a-302b, of the connector 112, according to one embodiment. Although 14 pins 302a-302b are depicted, the connector 112 may include any number of pins in other embodiments. Generally, a firmware of the smart module 102 may be stored in the memory 236. The firmware of the smart module 102 may support a plurality of different pin configurations based on a type of the electronic locking device 120 to which the smart module 102 is connected. For example, the schematic 300 depicts one example configuration that is based on an example electronic locking device 120. Generally, the configuration of the plurality of pins 302a-302b is dependent on corresponding pins of the electronic locking device 120. Therefore, the firmware of the smart module 102 may map, or assign, each pin 302a-302b based on the pins of the electronic locking device 120. As such, the pins 302a-302b may be mapped in a different configuration for a different electronic locking device 120. Advantageously, the firmware of the smart module 102 allows the smart module 102 to control any type of electronic locking device 120 based on the configuration of the plurality of pins of the connector 112. The smart module 102 may therefore be "plug-and-play" in that minimal configuration is needed to use the smart module 102 to control different electronic locking devices 120.

For example, as shown, pin 302a corresponds to a first motor pin for controlling a motor of the electronic locking device 120, while pin 302b corresponds to a fifth input pin. Although five example input pins are depicted, any number of pins may be allocated to receiving input from the electronic locking device 120. The inputs may be driven high to power an external sensor of the electronic locking device 120. Generally, the input pins may include pins for sensing a position (or state) of a deadbolt (or other locking mechanism) of the electronic locking device 120, thumb turn movement of the electronic locking device 120, key turn of the electronic locking device 120, a door position switch, and the like. The pins 302a-302b may further include pins for data communication, debugging, communication busses, power management, and the like.

In one example, the five input pins may include one input pin driven high to power a magnetic sensor of the electronic locking device 120, one input pin configured to sense a magnet of the electronic locking device 120, one input pin configured to sense a key turn of the electronic locking device 120, and two pins configured to receive input from two microswitches that sense the position of a deadbolt of the electronic locking device 120. Other possible input pin configurations include an exterior thumb turn lock state, interior thumb turn lock state, interior thumb turn unlock command, manual key operation, door position switch, engaging security and/or tamper modes, request to exit, interior thumb turn partially locked state, exterior thumb turn unlock command, exterior thumb turn partially locked state, interior lever actuation, exterior lever actuation, enable/disable privacy mode, enable/disable passage mode, a wake command for a smart module 102 that is in a sleep state, a motor locked state, and a motor partially locked state. Collectively, the input pins 302 may receive input from the electronic locking device 120, which may reflect whether an operation was performed successfully and/or unsuccessfully. For example, a deadbolt sensor may return a response indicating whether the deadbolt is locked or unlocked. Doing so may allow the smart module 102 to determine whether a command was successfully implemented by the electronic locking device 120.

Exemplary logic for implementing the above-described embodiments is next described in connection with FIGS. 4-7. The exemplary logic may be implemented in hardware, software, or a combination of hardware and software (e.g., being implemented at least partially in hardware).

Figure 4:
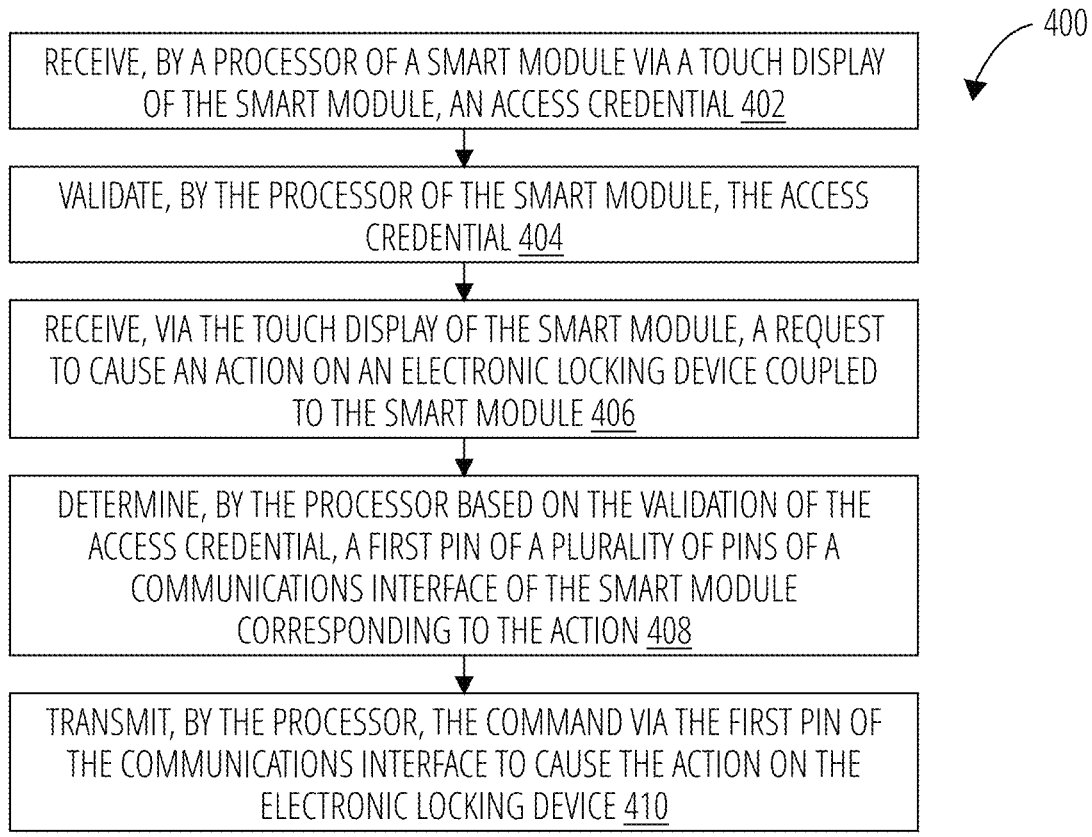
FIG. 4 illustrates a routine 400 in accordance with one embodiment.

FIG. 4 is a flowchart depicting exemplary logic routine 400 performed by a system or system components, such as one or more smart modules 102, as described above. The logic 400 may be embodied as digital logic, which may be implemented at least partially in hardware, embodying instructions for a processor circuit to perform the steps described below. Although FIG. 4 depicts a particular arrangement of elements in a particular order, it is understood that the configuration depicted in FIG. 4 is but one example. In other embodiments, more elements may be provided and/or some elements may be omitted, some elements may be performed in parallel, and/or elements may be performed in a different order.

In block 402, routine 400 receives, by a processor 222 of a smart module 102 via a touch display 104 of the smart module 102, an access credential. The access credential may comprise a PIN code, such as a series of digits. In block 404, routine 400 validates, by the smart module 102, the access credential received at block 402. For example, the processor 222 may provide the received input to the cryptographic module 232, which may compare the input to one or more stored access credentials (e.g., a plurality of stored PIN numbers in an access control list). If the comparison results in a match, the access credential is validated. Otherwise, the access credential is not validated, and the smart module 102 does may signal that the credential is not valid. In some embodiments, the smart module 102 determines a further response based on the determination that the credential is not valid. For example, if the number of received invalid and/or incorrect credentials exceeds a threshold number, the smart module 102 may enter a rate limiting mode or denial of service mode, e.g., where further input cannot be provided for a predetermined period of time. In block 406, routine 400 receives, via the touch display 104 of the smart module 102e, a request to cause an action on an electronic locking device 120 controlled by the smart module. For example, the action may specify to unlock the electronic locking device 120. In block 408, routine 400 determines, by the processor 222 based on the validation of the access credential, a first pin of a plurality of pins of a connector 112 of the smart module 102 corresponding to the action. Continuing with the previous example, the smart module 102 may determine which of the pins 302*a*-*b* of the connector 112 correspond to a pin for transmitting the unlock command. In block 410, routine 400 transmits, by the processor, the command via the first pin of the communications interface to cause the action on the electronic locking device 120 (e.g. power the motor drive circuit to operate the motor for a preconfigured amount of time at a preconfigured voltage and duty cycle). Doing so may cause the electronic locking device 120 to perform the unlock operation. In response, the status indicators 108 of the smart module 102 may illuminate to reflect the performance of the requested operation.

Figure 5:
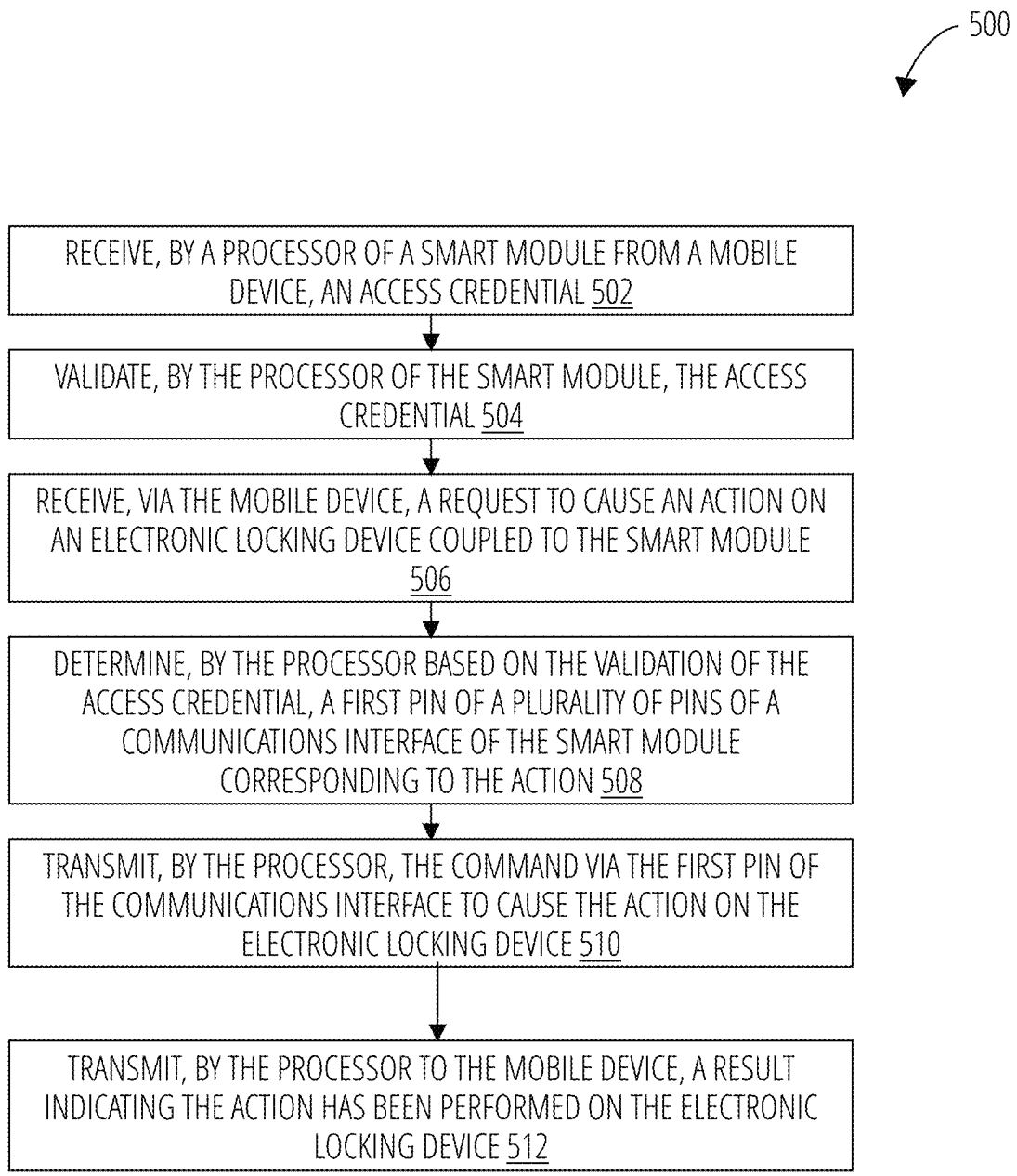
FIG. 5 illustrates a routine 500 in accordance with one embodiment.

FIG. 5 is a flowchart depicting exemplary logic routine 500 performed by a system or system components, such as one or more smart modules 102 and one or more mobile devices 116, as described above. The logic 500 may be embodied as digital logic, which may be implemented at least partially in hardware, embodying instructions for a processor circuit to perform the steps described below. Although FIG. 5 depicts a particular arrangement of elements in a particular order, it is understood that the configuration depicted in FIG. 5 is but one example. In other embodiments, more elements may be provided and/or some elements may be omitted, some elements may be performed in parallel, and/or elements may be performed in a different order.

In block 502, routine 500 receives, by a processor 222 of a smart module 102 from a mobile device 116, an access credential. For example, the mobile device 116 may transmit the access credential via NFC, Bluetooth, etc. In block 504, routine 500 validates, by the processor 222 of the smart module 102, the access credential received at block 502. For example, the processor 222 may provide the access credential to the cryptographic module 232, which may compare the access credential to one or more stored access credentials (e.g., a plurality of stored access credentials). If the comparison results in a match, the access credential is validated. Otherwise, the access credential is not validated, and the smart module 102 does not wake or otherwise process subsequent commands. In block 506, routine 500 receives, via the mobile device 116, a request to cause an action on an electronic locking device 120 controlled by the smart module 102. An application executing on the mobile device 116 may generate and/or transmit the command to the smart module 102. The application may be associated with a manufacturer of the smart module 102. For example, the action may specify to lock the electronic locking device 120 In block 508, routine 500 determines, by the processor based on the validation of the access credential, a first pin of a plurality of pins of the connector 112 of the smart module 102 corresponding to the action. Continuing with the previous example, the smart module 102 may determine which of the pins 302*a*-*b* of the connector 112 correspond to a pin for transmitting the lock command. In block 510, routine 500 transmits, by the processor 222, the command via the first pin of the connector 112 to cause the action on the electronic locking device 120. Doing so may cause the electronic locking device 120 to perform the lock operation. In response, the status indicators 108 of the smart module 102 may illuminate to reflect the performance of the requested operation. At block 512, the processor 222 may transmit, to the mobile device 116, a confirmation result indicating the requested operation has been performed. Doing so may cause the mobile device 116 to output a notification reflecting that the requested operation has been performed.

Figure 6:
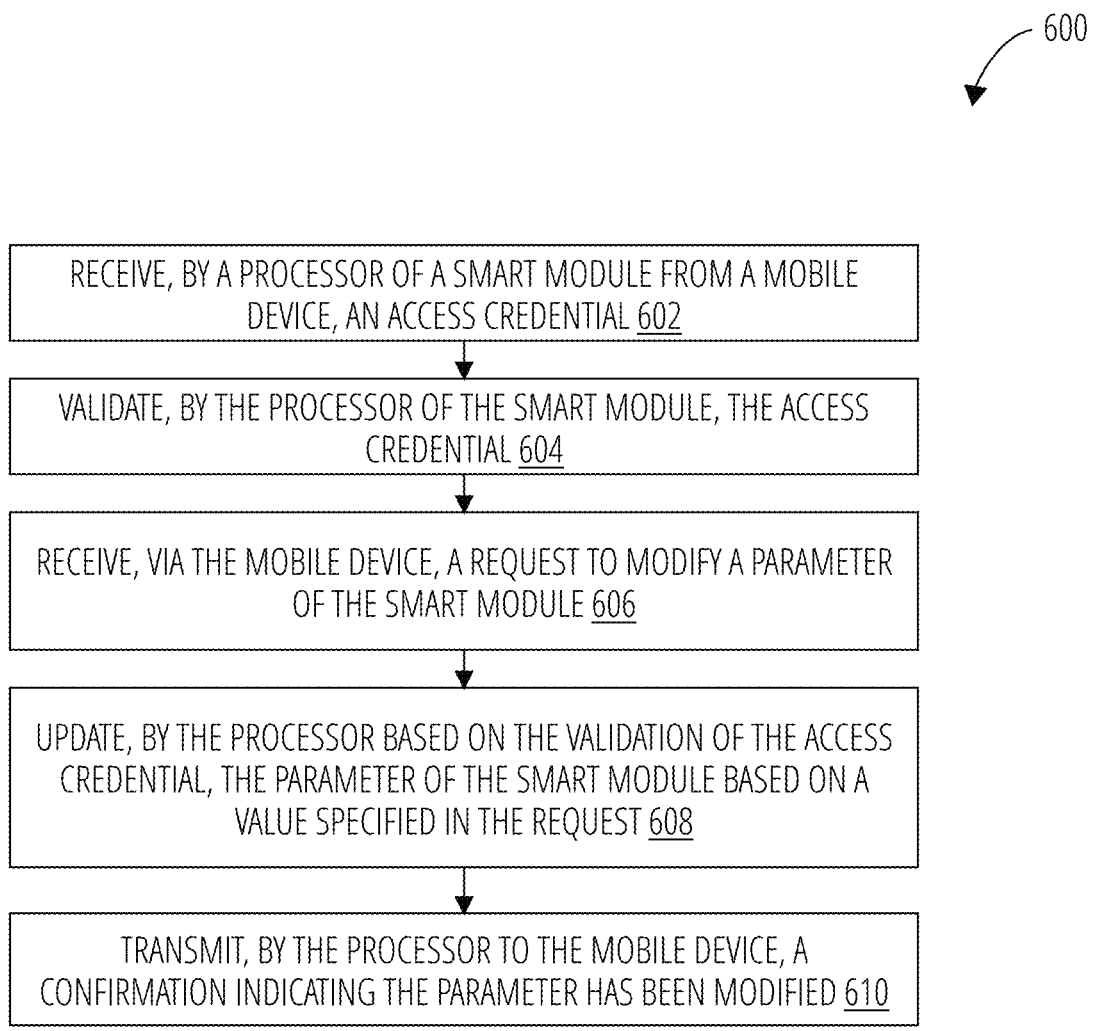
FIG. 6 illustrates a routine 600 in accordance with one embodiment.

FIG. 6 is a flowchart depicting exemplary logic routine 600 performed by a system or system components, such as one or more smart modules 102 and one or more mobile devices 116, as described above. The logic 600 may be embodied as digital logic, which may be implemented at least partially in hardware, embodying instructions for a processor circuit to perform the steps described below. Although FIG. 6 depicts a particular arrangement of elements in a particular order, it is understood that the configuration depicted in FIG. 6 is but one example. In other embodiments, more elements may be provided and/or some elements may be omitted, some elements may be performed in parallel, and/or elements may be performed in a different order.

In block 602, routine 600 receives, by a processor 222 of a smart module 102 from an application executing on mobile device 116, an access credential. For example, the application executing on the mobile device 116 may transmit the access credential via NFC, Bluetooth, etc. In block 604, routine 600 validates, by the smart module 102, the received access credential. For example, the processor 222 may provide the access credential to the cryptographic module 232, which may compare the access credential to one or more stored access credentials (e.g., a plurality of stored access credentials). If the comparison results in a match, the access credential is validated. Otherwise, the access credential is not validated, and the smart module 102 does not take any further action and may modify future behavior based on a history, e.g., in an access log of the smart module 102. For example, if the access log indicates a number of invalid access credentials (including the access credential received at block 602) received within a predetermined period of time exceeds a threshold number of invalid access credentials, the smart module 102 may "lock" itself from processing subsequent input for a predetermined period of time, e.g., by entering rate limiting mode and/or denial of service mode.

In block 606, routine 600 receives, via the mobile device, a request to modify a parameter value of the smart module 102. For example, the request may specify to disable remote (or cloud-based) commands, or configure the lock to remain unlocked for a specified period of time (a.k.a. passage mode). As another example, the request may specify to modify a duration of time the status indicators 108 are illuminated after performance of an operation (e.g., from 2 seconds to 5 seconds). In block 608, routine 600 updates, by the processor 222 based on the validation of the access credential, the parameter of the smart module 102 based on a value specified in the request (e.g., change the duration of time the status indicators 108 are illuminated from 2 to 5 seconds). At block 612, the processor 222 may transmit, to the mobile device 116, a confirmation result indicating the requested operation has been performed. Doing so may cause the mobile device 116 to output a notification reflecting that the requested parameter value has been updated.

Figure 7:
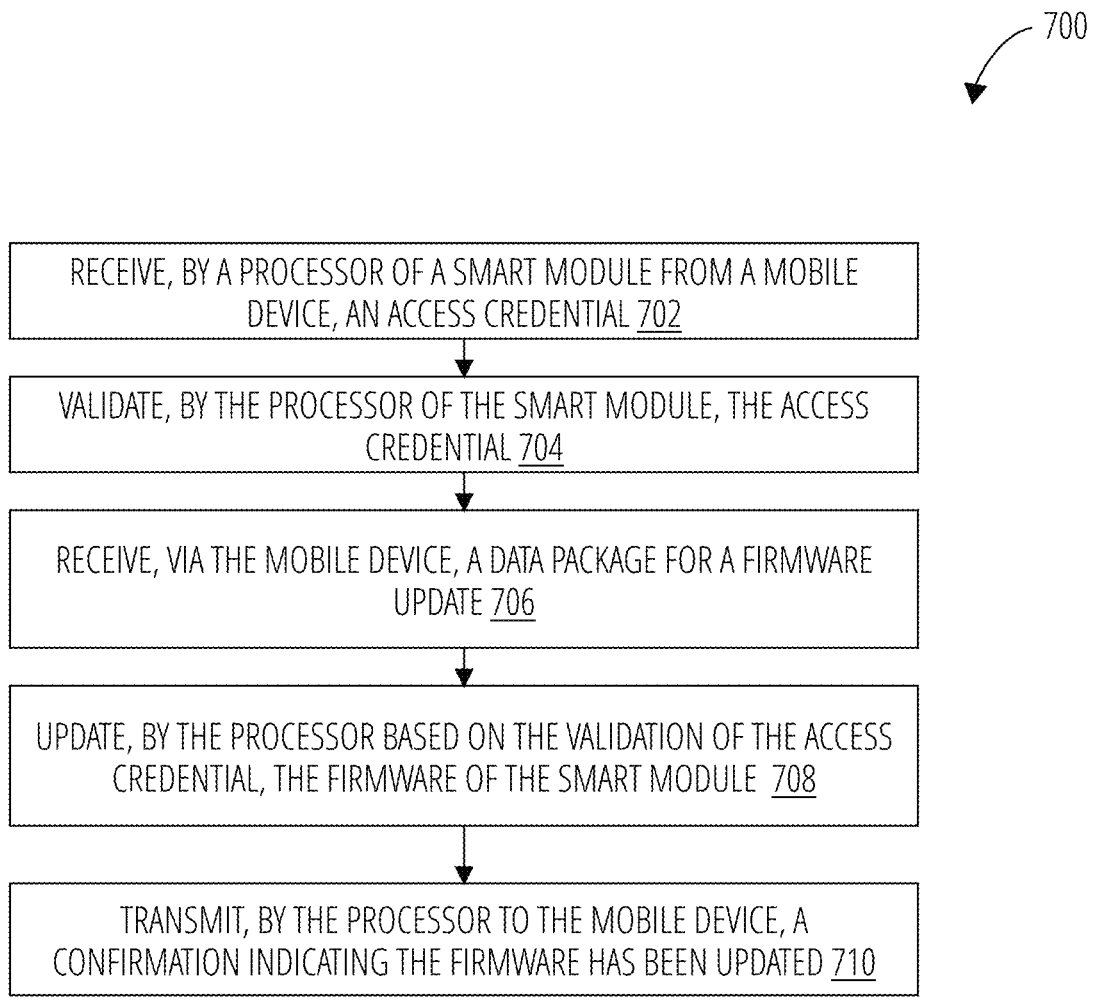
FIG. 7 illustrates a routine 700 in accordance with one embodiment.

FIG. 7 is a flowchart depicting exemplary logic routine 700 performed by a system or system components, such as one or more smart modules 102 and one or more mobile devices 116, as described above. The logic 700 may be embodied as digital logic, which may be implemented at least partially in hardware, embodying instructions for a processor circuit to perform the steps described below. Although FIG. 7 depicts a particular arrangement of elements in a particular order, it is understood that the configuration depicted in FIG. 7 is but one example. In other embodiments, more elements may be provided and/or some elements may be omitted, some elements may be performed in parallel, and/or elements may be performed in a different order.

In block 702, routine 700 receives, by a processor 222 of a smart module 102 from an application executing on a mobile device 116, an access credential. For example, the application executing on the mobile device 116 may transmit the access credential via NFC, Bluetooth, etc. In block 704, the routine 700 validates, by the processor 222 of the smart module 102, the access credential. For example, if the access credential is encrypted, the processor 222 may provide the access credential to the cryptographic module 232, which may attempt to decrypt the access credential. If the decryption is successful, the cryptographic module 232 may validate the access credential. If the decryption is not successful, the cryptographic module 232 may invalidate the access credential. In some embodiments, the cryptographic module 232 and/or the processor 222 may compare the decrypted access credential to one or more stored access credentials (e.g., a plurality of stored access credentials). If the comparison results in a match, the access credential is validated. Otherwise, the access credential is not validated, and the smart module 102 does not wake or otherwise process subsequent commands. In block 706, the routine 700 receives, via the mobile device 116, a data package for a firmware update. In block 708, the processor 222 updates the firmware of the smart module 102 based on the validation of the access credential. In block 710, the processor 222 may transmit, to the mobile device 116, a confirmation indicating the firmware of the smart module 102 has been updated.

Figure 8:
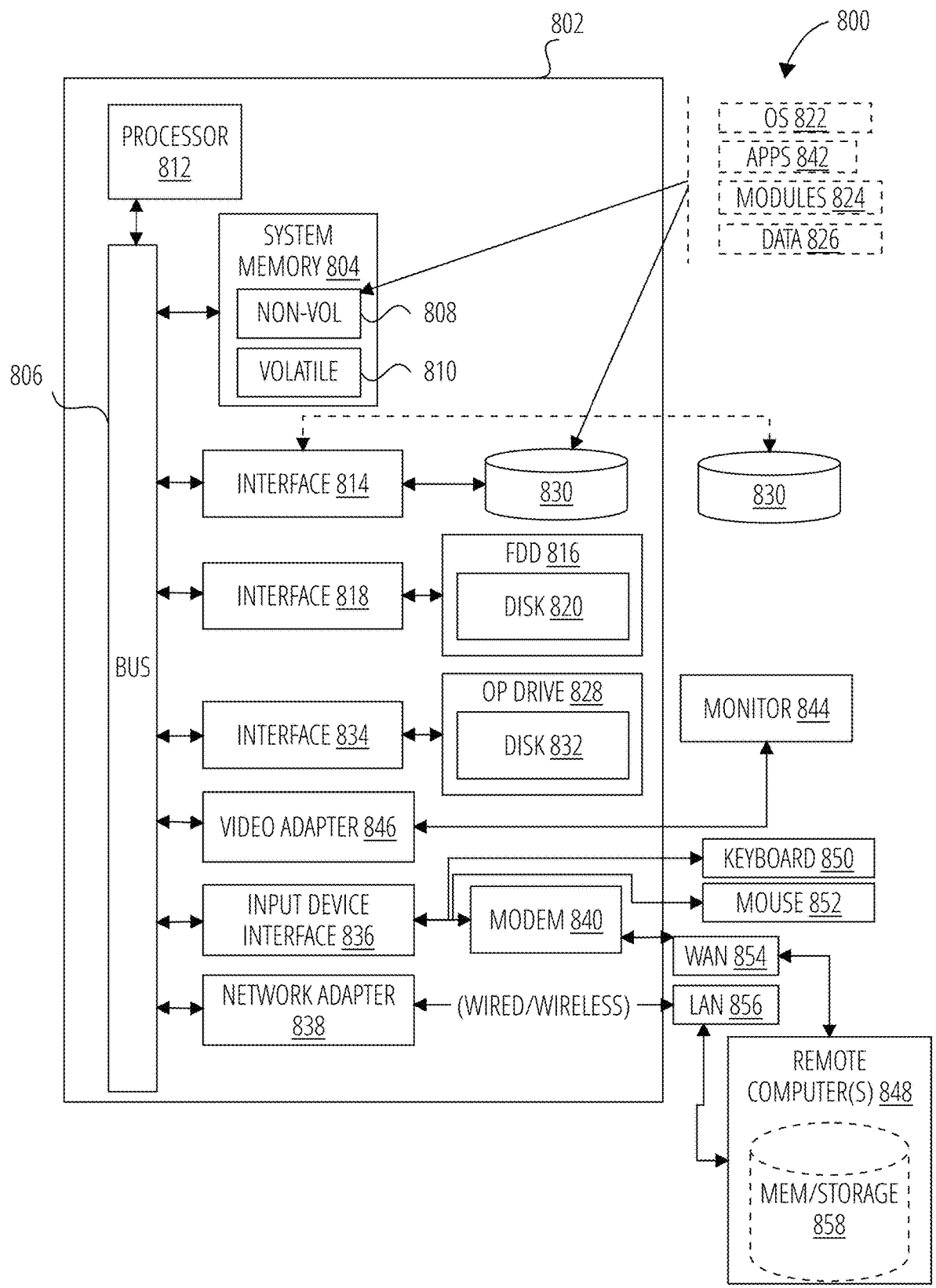
FIG. 8 illustrates a computer architecture 800 in accordance with one embodiment.

FIG. 8 illustrates an embodiment of an exemplary computer architecture 800 suitable for implementing various embodiments as previously described. In one embodiment, the computer architecture 800 may include or be implemented as part of the smart module 102.

As used in this application, the terms "system" and "component" are intended to refer to a computer-related entity, either hardware, a combination of hardware and software, software, or software in execution, examples of which are provided by the exemplary computing computer architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces. One example bus interface is an RS232 bus that can be routed from the smart module 102 to the electronic locking device 120 for extended I/O, state communication, sensing, etc.

The computing architecture 800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 800.

As shown in FIG. 8, the computing architecture 800 includes a processor 812, a system memory 804 and a system bus 806. The processor 812 can be any of various commercially available processors.

The system bus 806 provides an interface for system components including, but not limited to, the system memory 804 to the processor 812. The system bus 806 can be any of several types of bus structure that may further interconnect to a memory bus (with or without a memory controller), a peripheral bus, and a local bus using any of a variety of commercially available bus architectures. Interface adapters may connect to the system bus 808 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 800 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 804 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 804 can include non-volatile 808 and/or volatile 810. A basic input/output system (BIOS) can be stored in the non-volatile 808.

The computer 802 may include various types of computer-readable storage media in the form of one or more lower speed memory units, including an internal (or external) hard disk drive 830, a magnetic disk drive 816 to read from or write to a removable magnetic disk 820, and an optical disk drive 828 to read from or write to a removable optical disk 832 (e.g., a CD-ROM or DVD). The hard disk drive 830, magnetic disk drive 816 and optical disk drive 828 can be connected to system bus 806 the by an HDD interface 814, and FDD interface 818 and an optical disk drive interface 834, respectively. The HDD interface 814 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and non-volatile 808, and volatile 810, including an operating system 822, one or more applications 842, other program modules 824, and program data 826. In one embodiment, the one or more applications 842, other program modules 824, and program data 826 can include, for example, the various applications and/or components of the smart module 102.

A user can enter commands and information into the computer 802 through one or more wire/wireless input devices, for example, a keyboard 850 and a pointing device, such as a mouse 852. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processor 812 through an input device interface 836 that is coupled to the system bus 806 but can be connected by other interfaces such as a parallel port, IEEE 1394 serial port, a game port, a USB port, an IR interface, and so forth.

A monitor 844 or other type of display device is also connected to the system bus 806 via an interface, such as a video adapter 846. The monitor 844 may be internal or external to the computer 802. In addition to the monitor 844, a computer typically includes other peripheral output devices, such as speakers, printers, and so forth.

The computer 802 may operate in a networked environment using logical connections via wire and/or wireless communications to one or more remote computers, such as a remote computer(s) 848. The remote computer(s) 848 can be a workstation, a server computer, a router, a personal computer, portable computer, microprocessor-based entertainment appliance, a peer device or other common network node, and typically includes many or all the elements described relative to the computer 802, although, for purposes of brevity, only a memory and/or storage device 858 is illustrated. The logical connections depicted include wire/wireless connectivity to a local area network 856 and/or larger networks, for example, a wide area network 854. Such LAN and WAN networking environments are commonplace in offices and companies, and facilitate enterprise-wide computer networks, such as intranets, all of which may connect to a global communications network, for example, the Internet.

When used in a local area network 856 networking environment, the computer 802 is connected to the local area network 856 through a wire and/or wireless communication network interface or network adapter 838. The network adapter 838 can facilitate wire and/or wireless communications to the local area network 856, which may also include a wireless access point disposed thereon for communicating with the wireless functionality of the network adapter 838.

When used in a wide area network 854 networking environment, the computer 802 can include a modem 840, or is connected to a communications server on the wide area network 854 or has other means for establishing communications over the wide area network 854, such as by way of the Internet. The modem 840, which can be internal or external and a wire and/or wireless device, connects to the system bus 806 via the input device interface 836. In a networked environment, program modules depicted relative to the computer 802, or portions thereof, can be stored in the remote memory and/or storage device 858. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.118 (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the devices as previously described with reference to FIGS. 1A-7 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Figure 9:
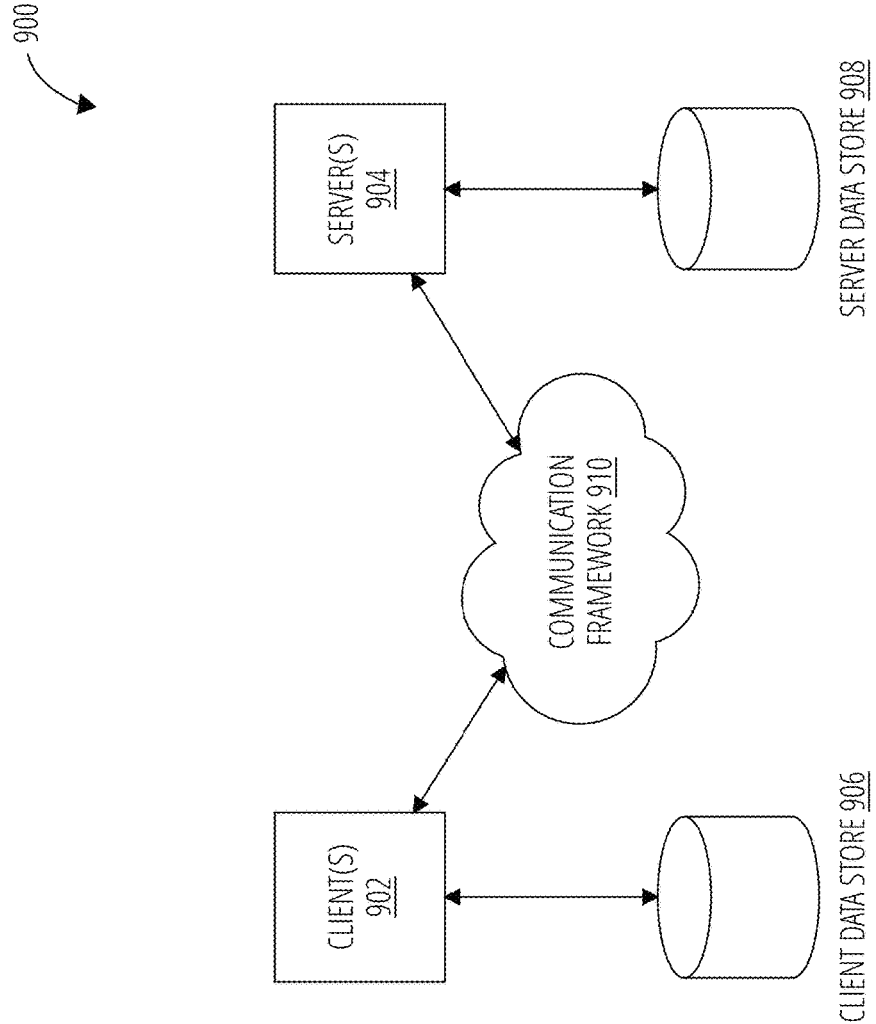
FIG. 9 illustrates a communications architecture 900 in accordance with one embodiment.

FIG. 9 is a block diagram depicting an exemplary communications architecture 900 suitable for implementing various embodiments as previously described. The communications architecture 900 includes various common communications elements, such as a transmitter, receiver, transceiver, radio, network interface, baseband processor, antenna, amplifiers, filters, power supplies, and so forth. The embodiments, however, are not limited to implementation by the communications architecture 900, which may be consistent with computer architecture 800.

As shown in FIG. 9, the communications architecture 900 includes one or more client(s) 902 and server(s) 904. The client(s) 902 and the server(s) 904 are operatively connected to one or more respective client data store 906 and server data store 908 that can be employed to store information local to the respective client(s) 902 and server(s) 904, such as cookies and/or associated contextual information.

The client(s) 902 and the server(s) 904 may communicate information between each other using a communication framework 910. The communication framework 910 may implement any well-known communications techniques and protocols. The communication framework 910 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communication framework 910 may implement various network interfaces arranged to accept, communicate, and connect to a communications network. A network interface may be regarded as a specialized form of an input/output (I/O) interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by client(s) 902 and the server(s) 904. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more exemplary embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus to electronic control locking devices, comprising:
   a plurality of wireless interfaces, wherein each of the plurality of wireless interfaces are configured to operate in accordance with at least one of a plurality of wireless protocols;
   a communications interface comprising a plurality of pins to couple to a plurality of electronic locking devices, the plurality of electronic locking devices including a first electronic locking device;
   a touch display;
   a wireless charging component;
   processing circuitry coupled with the plurality of wireless interfaces, the touch display, and the communications interface; and
   a memory coupled with the plurality of wireless interfaces, the processing circuitry, the communications interface, and the touch display, the memory comprising a firmware, that when executed by the processing circuitry, cause the processing circuitry to:
      receive, from a mobile device, power via the wireless charging component;
      receive, from the mobile device based on the receipt of power via the wireless charging component, an access credential to access the first electronic locking device;
      determine a first pin of the plurality of pins of the communications interface to transmit a command to unlock the first electronic locking device, the first pin determined according to a configuration specifying a mapping of pins of the first electronic locking device; and
      transmit, based on the receipt of the access credential and the configuration for the first electronic locking device, the command to the first electronic locking device via the first pin of the communications interface to unlock the first electronic locking device.

2. The apparatus of claim 1, the firmware comprising instructions, that when executed by the processing circuitry, cause the processing circuitry to:
   determine the first pin of the plurality of pins of the communications interface corresponding to the command based on a validation of the access credential.

3. The apparatus of claim 2, wherein the configuration of the firmware comprises a configuration of the plurality of pins of the communications interface, wherein the configuration of the plurality of pins is based on a type of the first electronic locking device, wherein the plurality of electronic locking devices comprise different types of electronic locking devices.

4. The apparatus of claim 3, the firmware comprising instructions, that when executed by the processing circuitry, cause the processing circuitry to:
   receive, via the touch display, a request to cause an action on a second electronic locking device of the plurality of electronic locking devices;
   determine, based on a type of the second electronic locking device, a second pin of the plurality of pins corresponding to the action; and
   transmit a second command to the second electronic locking device via the second pin of the communications interface to cause the action on the second electronic locking device.

5. The apparatus of claim 1, the firmware comprising instructions, that when executed by the processing circuitry, cause the processing circuitry to, prior to transmitting the command to the first electronic locking device:
   compare the access credential to a list of valid access credentials stored in the memory to validate the access credential.

6. The apparatus of claim 1, the firmware comprising instructions, that when executed by the processing circuitry, cause the processing circuitry to:
   receive, via the communications interface, a response from the first electronic locking device; and
   determine, based on the response, that the first electronic locking device was unlocked.

7. The apparatus of claim 1, wherein the plurality of wireless interfaces are configured to support at least one wireless protocol, the at least one wireless protocol to comprise a near-field communication (NFC) protocol, a Bluetooth low energy (BLE) protocol, or an 802.11 protocol.

8. The apparatus of claim 1, the firmware comprising instructions, that when executed by the processing circuitry, cause the processing circuitry to:
   receive, from a mobile device via one of the plurality of wireless interfaces, a firmware update; and
   update a firmware of the apparatus using the firmware update.

9. The apparatus of claim 1, wherein the apparatus does not include batteries, wherein the wireless charging component is the sole source of power for the apparatus.

10. The apparatus of claim 1, the wireless charging component configured to wirelessly provide power to a mobile device, the firmware comprising instructions, that when executed by the processing circuitry, cause the processing circuitry to:
    receive, from the mobile device via one of the plurality of wireless interfaces, an access credential and a second request to modify a setting on the first electronic locking device;
    validate the access credential; and
    transmit a second command to the first electronic locking device via the communications interface to cause the setting to be modified on the first electronic locking device.

11. A method, comprising:
    receiving power by a wireless charging component of a smart module from a mobile device;
    receiving, by a firmware executing on a processor of the smart module and from the mobile device based on the receipt of power via the wireless charging component, an access credential to access a first electronic locking device of a plurality of electronic locking devices, wherein the smart module comprises a plurality of wireless interfaces, wherein each of the plurality of wireless interfaces are configured to operate in accordance with at least one of a plurality of wireless protocols, wherein the smart module further comprises a communications interface comprising a plurality of pins suitable to couple to any one of a plurality of electronic locking devices via a cable, the plurality of electronic locking devices including the first electronic locking device;

determining a first pin of the plurality of pins of the communications interface to transmit a command to unlock the first electronic locking device, the first pin determined according to a configuration specifying a mapping of pins of the first electronic locking device; and transmitting, by the firmware of the smart module based on the receipt of the access credential and the configuration for the first electronic locking device specified in the firmware, the command to the first electronic locking device via the first pin of the communications interface to unlock the first electronic locking device.

12. The method of claim 11, further comprising:
determining, by the firmware, the first pin of the plurality of pins of the communications interface corresponding to the command based on a validation of the access credential.

13. The method of claim 12, wherein the configuration of the firmware comprises a configuration of the plurality of pins of the communications interface, wherein the configuration of the plurality of pins is based on a type of the first electronic locking device, wherein the plurality of electronic locking devices comprise different types of electronic locking devices.

14. The method of claim 13, wherein the firmware is configured to control a plurality of electronic locking devices including the first electronic locking device, wherein the plurality of electronic locking devices comprise different types of electronic locking devices, wherein at least one type of electronic locking device comprises an electromagnetic locking device, wherein the plurality of wireless protocols comprise a near-field communication (NFC) protocol, a Bluetooth low energy (BLE) protocol, and an 802.11 protocol.

15. The method of claim 14, further comprising:
receiving, via a touch display of the smart module, a request to cause an action on a second electronic locking device of the plurality of electronic locking devices;
determining, by the firmware based on a type of the second electronic locking device, a second pin of the plurality of pins corresponding to the action; and
transmitting, by the processor, a second command to the second electronic locking device via the second pin of the communications interface to cause the action on the second electronic locking device.

16. The method of claim 11, further comprising:
receiving, by the processor via the communications interface, a response from the first electronic locking device; and
determining, by the processor based on the response, that the first electronic locking device was unlocked.

17. The method of claim 11, further comprising:
receiving, by the processor and from the mobile device via one of the plurality of wireless interfaces, an access credential and a request to cause an action on the first electronic locking device;
validating, by a cryptographic processor of the smart module, the access credential; and
transmitting, by the processor, a second command to the first electronic locking device via the communications interface to cause the action on the first electronic locking device.

18. The method of claim 17, further comprising:
receiving, by the processor from the mobile device via one of the plurality of wireless interfaces, input specifying to modify a parameter of the smart module; and
modifying, by the processor, the parameter of the smart module based on the received input.

19. The method of claim 11, wherein the smart module does not include batteries, wherein the wireless charging component is the sole source of power for the smart module.

20. The method of claim 11, further comprising:
receiving, from the mobile device via one of the plurality of wireless interfaces, an access credential and a second request to modify a setting on the first electronic locking device;
validate the access credential; and
transmit a second command to the first electronic locking device via the communications interface to cause the setting to be modified on the first electronic locking device.

* * * * *